US 8,016,365 B2

(12) United States Patent
Yuda et al.

(10) Patent No.: US 8,016,365 B2
(45) Date of Patent: Sep. 13, 2011

(54) UNDERSTEER SUPPRESSING APPARATUS FOR VEHICLE (75) Inventors: Masato Yuda, Wako (JP); Yoshimichi Kawamoto, Wako (JP); Norio Yamazaki, Wako (JP); Shigenori Takimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1192 days.

(21) Appl. No.: 11/374,702

(22) Filed: Mar. 14, 2006

(65) Prior Publication Data
US 2006/0208564 A1 Sep. 21, 2006

(30) Foreign Application Priority Data

Mar. 16, 2005 (JP) ................................. 2005-074907

(51) Int. Cl.
*B60T 8/60* (2006.01)
*B62D 6/00* (2006.01)

(52) U.S. Cl. .................. 303/146; 303/189; 303/DIG. 6; 701/41

(58) Field of Classification Search .................. 303/146, 303/147, 148, 187, 188, 189, DIG. 6; 701/41, 701/70, 72
See application file for complete search history.

(56) References Cited

U.S. PATENT DOCUMENTS

| 5,303,989 | A | * | 4/1994 | Yasuno et al. ................ 303/147 |
| 5,345,385 | A | | 9/1994 | Zomotor et al. |
| 6,374,162 | B1 | * | 4/2002 | Tanaka et al. ................. 303/147 |
| 6,415,215 | B1 | | 7/2002 | Nishizaki et al. |
| 6,823,245 | B2 | * | 11/2004 | Sugitani et al. ................. 701/41 |
| 7,008,026 | B2 | * | 3/2006 | Baumgarten ................. 303/146 |
| 2002/0156580 | A1 | * | 10/2002 | Matsuura ........................ 701/41 |

FOREIGN PATENT DOCUMENTS

| DE | 10109580 | 8/2001 |
| DE | 4123234 | 6/2007 |
| JP | 2000-108919 | 4/2000 |

* cited by examiner

*Primary Examiner* — Thomas J Williams
(74) *Attorney, Agent, or Firm* — Rankin, Hill & Clark LLP (57) ABSTRACT

An understeer suppressing apparatus for a vehicle includes an electric power steering device S for suppressing steering when the vehicle is in the understeer state, an alarm device A for informing a driver that the vehicle is in the understeer state, and a braking force distribution device B for generating moment of the vehicle by applying braking forces different from each other to the left and right wheels. As the degree of understeer is increased, the electric power steering device S, the alarm device A, and the braking force distribution device B are operated in this order.

3 Claims, 7 Drawing Sheets

UNDERSTEER SUPPRESSING APPARATUS FOR VEHICLE

The present invention claims foreign priority to Japanese patent application No. P.2005-074907, filed on Mar. 16, 2005, the contents of which is incorporated herein by reference.

BACKGROUND OF THE INVENTION

1. Field of the Invention

The present invention relates to an apparatus for suppressing understeer of a vehicle.

2. Description of the Background Art

In a known steering apparatus, an understeer state is detected on the basis of a physical property to be changed in accordance with a vehicle behavior, and steering forces are applied to steering wheels in accordance with the degree of understeer so as to suppress increase of the degree of understeer (For example, see Japanese Patent Unexamined Publication No. JP-A-2000-108919)

However, since the driver has sensitivity different from one another, it is difficult to inform the understeer state of the driver only by steering reaction force. Accordingly, it is difficult to prevent the understeer from increasing only by applying the steering reaction force.

In addition, when the vehicle behavior is in an unstable state such as an understeer state, a method of warning the driver by generating a warning sound is generally used. However, it is impossible to stabilize the vehicle only by the warning sound. Furthermore, if the warning sound is frequently generated on the freezing road and snow road in a cold area, the driver is confused.

SUMMARY OF THE INVENTION

Therefore, the invention provides an understeer suppressing apparatus for a vehicle capable of stabilizing the vehicle while coping with instability of the vehicle in accordance with the degree of understeer step by step.

In order to solve the above-mentioned problems, according to an aspect of the invention, there is provided an understeer suppressing apparatus for a vehicle comprising:

a steering reaction force device (for example, an electric power steering device S in an embodiment to be described below) for suppressing steering when the vehicle is in an understeer state;

an alarm device (for example, a warning device A in an embodiment to be described below) for informing that the vehicle is in the understeer state; and a braking force distribution device (for example, a braking force distribution device B in an embodiment to be described below) for generating moment of the vehicle by applying braking forces different from each other to a left and right wheels, wherein as a degree of understeer is increased, the steering reaction force device, the alarm device, and the braking force distribution device are operated in this order.

According to a second aspect of the present invention, as set forth in the first aspect of the present invention, it is preferable that when the alarm device is operated, the steering reaction force device is continuously operated.

According to a third aspect of the present invention, as set forth in the first aspect of the present invention, it is preferable that when the brake force distribution device is operated, the steering reaction force device and the alarm device are continuously operated.

According to the above-mentioned structure, when the degree of understeer is relatively small, steering is suppressed by the steering reaction force device. Accordingly, it is possible to improve the understeer state. When the degree of understeer is increased in spite of the steering suppression performed by the steering reaction force device, the driver perceives that the vehicle is in the understeer state by the alarm device. For this reason, it is possible to allow the driver to drive the vehicle in a direction improving from the understeer state. When the degree of understeer is increased in spite of the information from the alarm device, the understeer can be compulsorily suppressed by the braking force distribution device.

According to the aspect of the invention, since informing the driver (such as the steering reaction force device or the alarm device) and operation to the vehicle (such as the braking force distribution device) are performed step by step, it is possible to inform the driver of the vehicle state in an early step, and to allow the driver to drive the vehicle in a stable direction. Moreover, the driver can easily and reliably perceive that the vehicle is in the understeer state. In addition, since the informing device informs the driver in two stages (i.e. the steering reaction force device as the first stage and the alarm device as the second stage), it is possible to prevent from frequently generating alarm sound. Furthermore, since the braking force distribution device B is operated in the final stage, it is possible to reliably stabilize the vehicle.

DETAILED DESCRIPTION OF THE PREFERRED EMBODIMENTS

Hereinafter, a preferred embodiment of an understeer suppressing apparatus for a vehicle according to the invention will be described in detail with reference to FIGS. 1 to 7. In addition, the present embodiment is a type of a rear drive vehicle.

Figure 1:
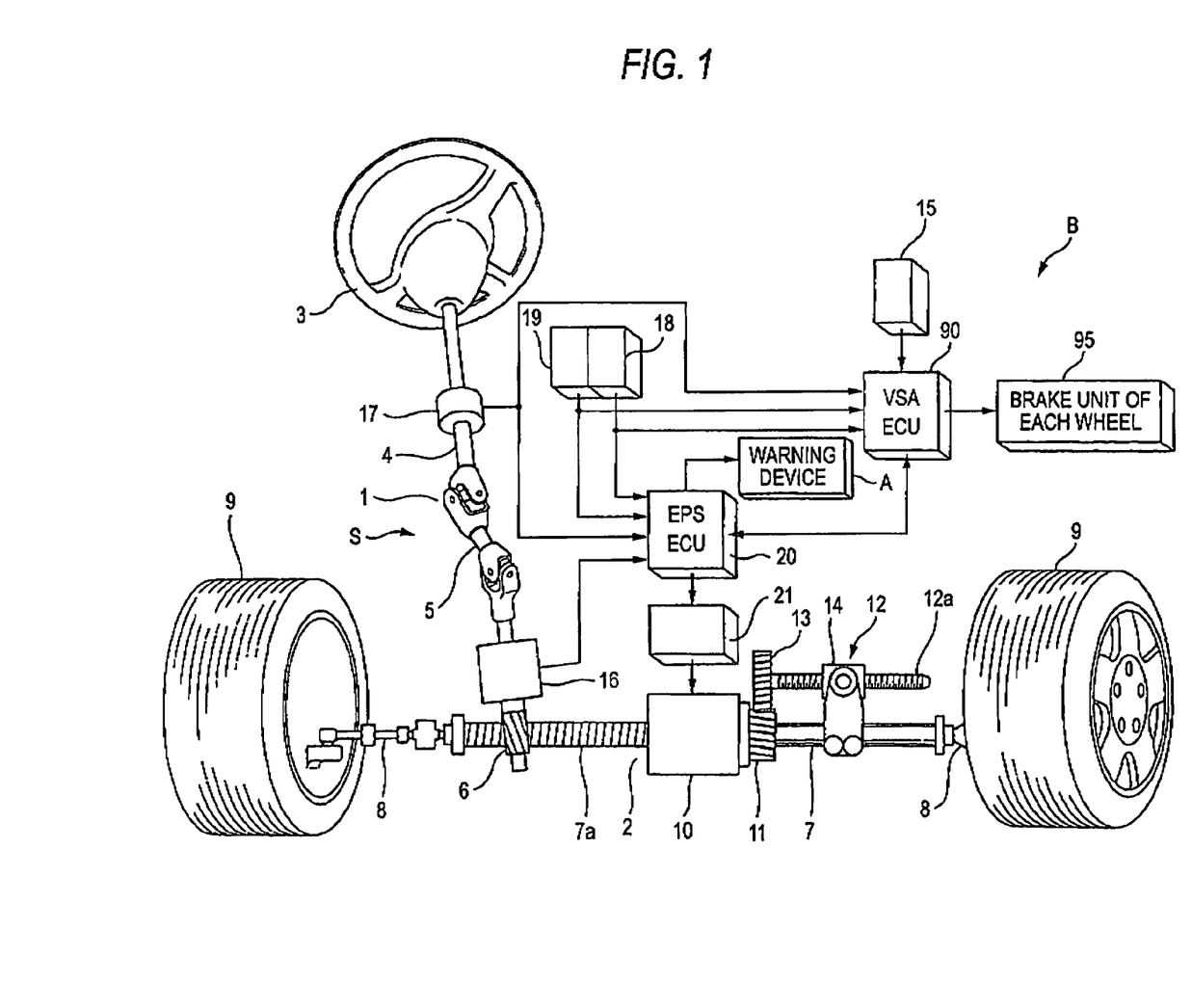
FIG. 1 is a view showing the structure of an embodiment of an understeer suppressing apparatus according to the invention.

The understeer suppressing apparatus includes an electric power steering device (steering reaction forth device) S, a warning device (alarm device) A, and a braking force distribution device B.

The electric power steering device S includes a manual steering force generating unit 1, a steering unit 2, front wheels 9 and 9 serving as drive road wheels, a steering motor 10, and a steering control unit 20, as main components. The braking force distribution device B includes a brake control unit (VSA-ECU) 90 and a brake unit 95 of each wheel, as main components. The warning device A includes a warning sound generator such as a buzzer, or a warning lamp.

In the manual steering force generating unit 1, a steering shaft 4 integrally formed with a steering wheel 3 is connected to a pinion 6 of a rack-pinion mechanism by a connecting shaft 5 having universal joints. The pinion 6 is engaged with a rack 7a of a rack shaft 7 that can reciprocate in a vehicle width direction, and left and right front wheels 9 and 9 serving as drive steering wheels connected to both ends of the rack shaft 7 by tie rods 8 and 8. According to the above-mentioned structure, when the steering wheel 3 is steered, it is possible to perform a usual rack-pinion steering operation. Therefore, a vehicle can veer by steering the front wheels 9 and 9. The steering unit 2 is composed of the rack shaft 7 and the tie rods 8 and 8.

Furthermore, the steering motor 10 for providing an auxiliary steering force is disposed coaxially with the rack shaft 7 to reduce the steering force generated by the manual steering force generating unit 1. The auxiliary steering force provided by the steering motor 10 is converted into thrust force by a ball screw mechanism 12, which is provided substantially parallel to the rack shaft 7, and then is applied to the rack shaft 7. For this purpose, a driving helical gear 11 is integrally provided to a rotor of the steering motor 10 into which the rack shaft 7 is inserted, and a driven helical gear 13 engaged with the driving helical gear 11 is provided to one end of the screw shaft 12a of the ball screw mechanism 12. Furthermore, a nut 14 of the ball screw mechanism 12 is fixed to the rack shaft 7.

The steering shaft 4 is provided with a steering angle sensor 17 for detecting a steering angle of the steering shaft 4, and a steering torque sensor 16 for detecting a steering torque applied to the pinion 6 is provided in the steering gear box (not shown) in which the rack-pinion mechanism (6, 7a) is received. In addition, a vehicle body is provided with a lateral acceleration sensor 15 for detecting a lateral acceleration of a vehicle, a yaw rate sensor (vehicle behavior detecting unit) 18 for detecting a yaw rate of a vehicle, and a vehicle speed sensor 19 for detecting a vehicle speed, at proper positions thereof.

The steering angle sensor 17, the yaw rate sensor 18, and the vehicle speed sensor 19 output an electric signal corresponding to the detected steering angle, an electric signal corresponding to the detected yaw rate angle, and an electric signal corresponding to the detected vehicle speed, respectively, to the steering control unit (EPO-ECU) 20 and the brake control unit 90. The lateral acceleration sensor 15 outputs an electric signal corresponding to the detected lateral acceleration to the brake control unit 90, and the steering torque sensor 16 outputs an electric signal corresponding to the detected steering torque to the steering control unit 20. In addition, if necessary, the steering control unit 20 and the brake control unit 90 may be connected to each other so as to communicate necessary information with each other.

Meanwhile, the steering control unit 20 determines a target current value to be supplied to the steering motor 10 on the basis of control signals, which are obtained by processing input signals input from the steering torque sensor 16, the steering angle sensor 17, the yaw rate sensor 18, and the vehicle speed sensor 19. Then, the steering control unit supplies the target current value to the steering motor 10 via a drive circuit 21 to control an output torque of the steering motor 10 and the auxiliary steering force in the steering operation.

Figure 2:
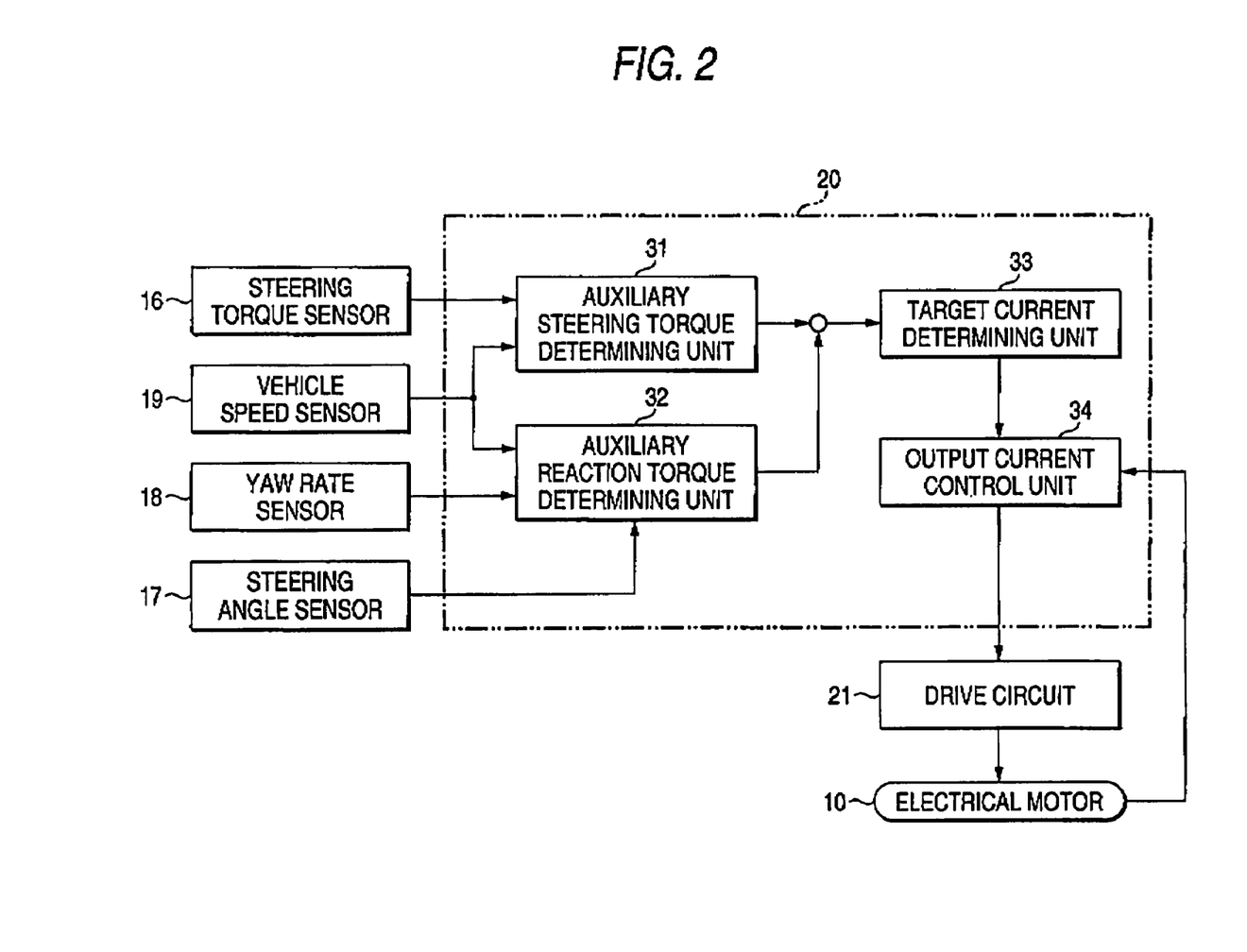
FIG. 2 is a block diagram showing an output torque control of the steering motor in an electric power steering device of the embodiment.

An output torque control of the steering motor 10 in the electric power steering device S will be briefly described with reference to a control block diagram shown in FIG. 2.

The steering control unit 20 includes an auxiliary steering torque determining unit 31, an auxiliary reaction torque determining unit 32, a target current determining unit 33, and an output current control unit 34.

The auxiliary steering torque determining unit 31 determines an auxiliary steering torque on the basis of the output signals output from the steering torque sensor 16 and the vehicle speed sensor 19. Since a method of determining the auxiliary steering torque in the auxiliary steering torque determining unit 31 is the same as that in the known electric power steering device, the detailed description thereof will be omitted. However, in the known electric power steering device, approximately, as the steering torque is increased, the auxiliary steering torque is increased. Furthermore, as the vehicle speed is increased, the auxiliary steering torque is decreased.

The auxiliary reaction torque determining unit 32 determines an auxiliary reaction torque on the basis of the output signals output from the steering angle sensor 17, the yaw rate sensor 18, and the vehicle speed sensor 19.

Figure 3:
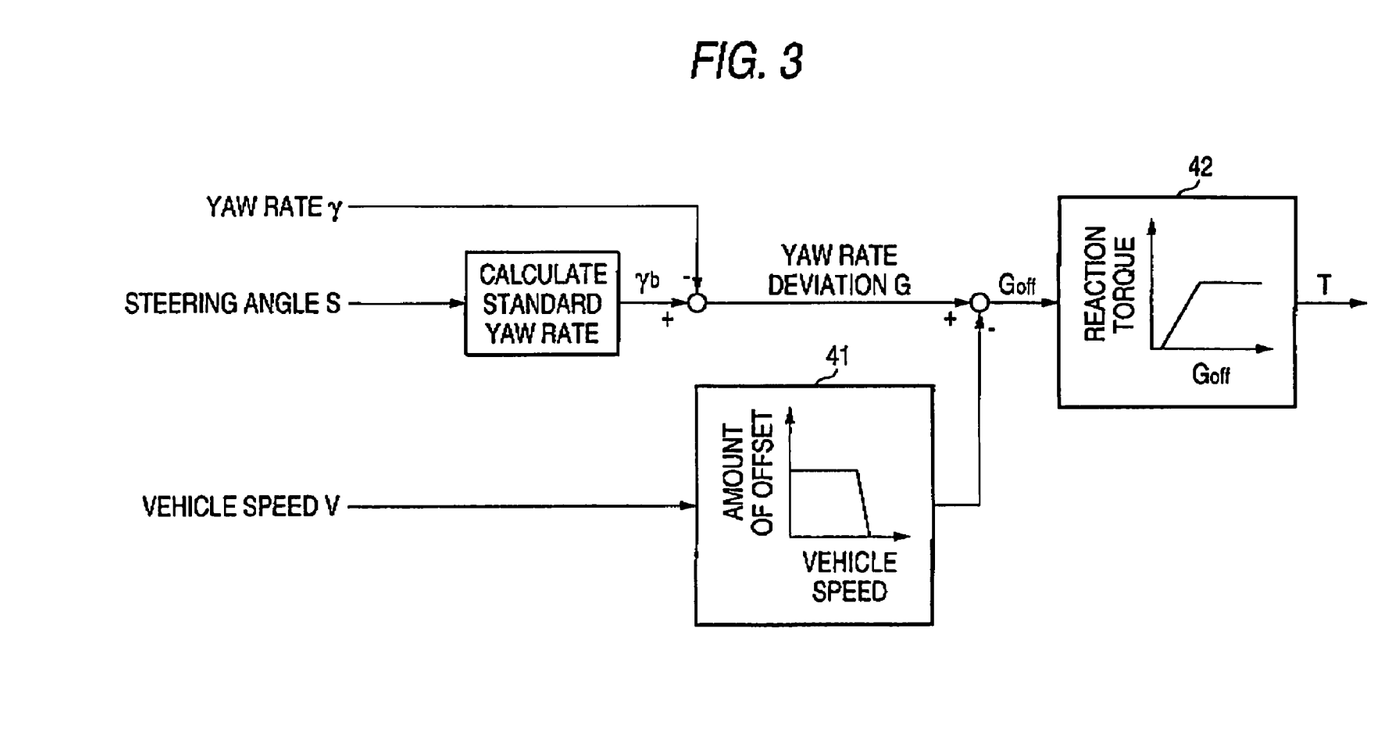
FIG. 3 is a block diagram showing a process of determining the auxiliary reaction torque in the output torque control of the steering motor according to the embodiment.

A process of determining the auxiliary reaction torque will be briefly described with reference to a block diagram shown in FIG. 3. A standard yaw rate $\gamma_b$ is calculated on the basis of the output signals output from the steering angle sensor 17 and the vehicle speed sensor 19, and then a deviation G (yaw rate deviation) between the standard yaw rate $\gamma_b$ and the yaw rate $\gamma$ detected by the yaw rate sensor 18 is obtained ($G=\gamma_b-\gamma$). Here, the standard yaw rate $\gamma_b$ is a yaw rate to be a reference, which is predetermined on the basis of the vehicle speed V and the steering angle SA. When the yaw rate deviation G is a positive value, it is an understeer state in which the standard yaw rate $\gamma_b$ is larger than the actual yaw rate $\gamma$. Accordingly, the magnitude of the yaw rate deviation G shows a degree of understeer.

In addition, an amount of offset according to the vehicle speed is calculated with reference to an offset table 41. According to the offset table 41, the amount of offset has a predetermined positive value to be constant in a low vehicle speed range. Furthermore, in a high vehicle speed range higher than a predetermined vehicle speed, as the vehicle speed is increased, the amount of offset is gradually decreased and then is finally to be 'zero'.

Meanwhile, a yaw rate deviation (hereinafter, referred to as a yaw rate deviation after offset) $G_{off}$ after offset is calculated by subtracting the amount of offset from the yaw rate deviation G. An auxiliary reaction torque T is obtained with reference to the auxiliary reaction torque table 42 on the basis of the yaw rate deviation $G_{off}$ after offset. According to the auxiliary reaction torque table 42, as the yaw rate deviation $G_{off}$ after offset is increased, the auxiliary reaction torque T is increased.

The auxiliary reaction torque according to the yaw rate deviation $G_{off}$ after offset is calculated as described above. Since the amount of offset in a high vehicle speed range is smaller than that in a low vehicle speed range, it is possible to generate a reaction force component from when the irregular vehicle behavior easily occurs, that is, the vehicle speed is high and the yaw rate deviation G is relatively small. It is possible to suppress the generation of a reaction force in a low vehicle speed range to when the yaw rate deviation G is relatively large. Hereinafter, an auxiliary reaction torque control according to the yaw rate deviation G is referred to as a 'yaw rate deviation reaction force control'.

The target current determining unit 33 subtracts the auxiliary reaction torque determined by the auxiliary reaction torque determining unit 32 from the auxiliary steering torque determined by the auxiliary steering torque determining unit 31 to calculate a target output torque of the steering motor 10. Then, the target current determining unit determines the target current according to the target output torque on the basis of the known output characteristic of the steering motor 10.

The output current control unit 34 controls the output current to be output to the steering motor 10 so that the actual current of the steering motor 10 is equal to the target current determined by the target current determining unit 33, and then outputs the controlled output current to the drive circuit 21.

As described above, in the present embodiment, the target output torque of the steering motor 10 is determined by subtracting the auxiliary reaction torque from the auxiliary steering torque, and the steering motor 10 is driven so as to obtain the target output torque. Accordingly, the electric power steering device S is a steering assist device for generating an assist force when the driver operates an operator. At the same time, the electric power steering device is a steering reaction force device, which generates a reaction force according to the yaw rate deviation G by using the yaw rate deviation G as a parameter of the vehicle behavior to suppress steering.

Furthermore, as the yaw rate deviation G is increased, that is, a degree of understeer is increased, the electric power steering device S generates a larger reaction force to suppress steering and improve the understeer.

Meanwhile, the brake control unit 90 controls a brake unit 95 and brake pressure of each wheel in order to prevent the vehicle from skidding on the basis of control signals, which are obtained by processing input signals input from the lateral acceleration sensor 15, the steering angle sensor 17, the yaw rate sensor 18, and the vehicle speed sensor 19.

Figure 4:
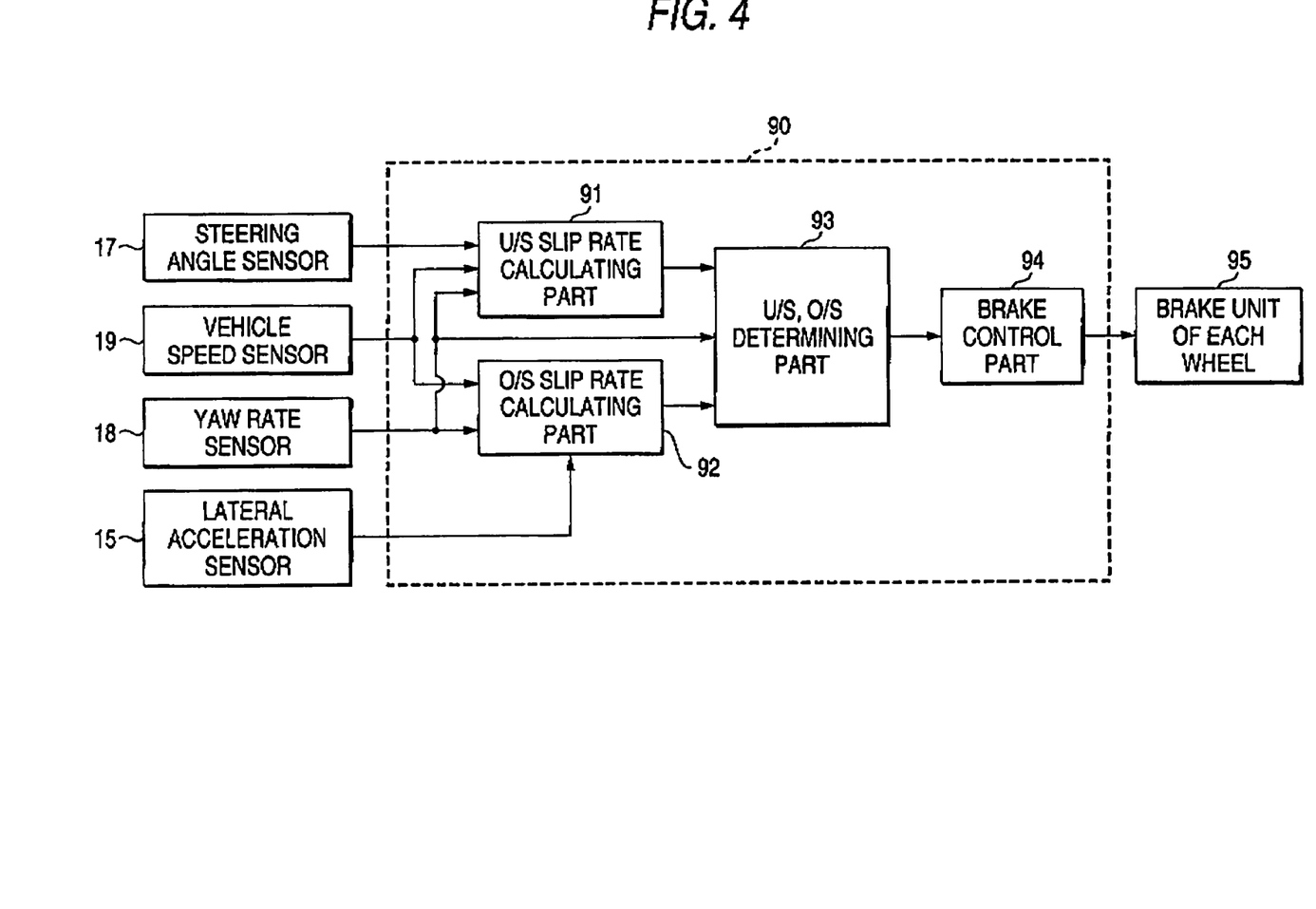
FIG. 4 is a block diagram showing a brake pressure control in a braking force distribution device of the embodiment.

A brake pressure control in the braking force distribution device B will be briefly described with reference to a control block diagram shown in FIG. 4.

The brake control unit 90 includes an understeer slip rate calculating part (hereinafter, simply referred to as an U/S slip rate calculating part) 91, an oversteer slip rate calculating part (hereinafter, simply referred to as an O/S slip rate calculating part) 92, an understeer/oversteer determining part (hereinafter, simply referred to as a determining part) 93, and a brake control part 94.

The U/S slip rate calculating part 91 calculates an U/S slip rate on the basis of the steering angle detected by the steering angle sensor 17, and the vehicle speed detected by the vehicle speed sensor 19, and the yaw rate detected by the yaw rate sensor 18.

The O/S slip rate calculating part 92 calculates an O/S slip rate on the basis of the lateral acceleration detected by the lateral acceleration sensor 15, the vehicle speed detected by the vehicle speed sensor 19, and the yaw rate detected by the yaw rate sensor 18.

The determining part 93 determines whether the vehicle is in the understeer state or oversteer state, on the basis of the U/S slip rate calculated by the U/S slip rate calculating part 91, the O/S slip rate calculated by the O/S slip rate calculating part 92, and the yaw rate detected by the yaw rate sensor 18. In addition, the determining part calculates the degree of understeer or oversteers.

The brake control part 94 calculates the degree of the control for compensating the braking force of the left and right wheels so as to suppress the understeer or oversteer on the basis of the determination result determined by the determining part 93.

For example, if the determining part 93 determines that the vehicle is in the understeer state at the time of turning right, the understeer suppressing control for increasing the brake pressure of the brake for the right front wheel is performed. In addition, if the determining part 93 determines that the vehicle is in the understeer state at the time of turning left, the understeer suppressing control for increasing the brake pressure of the brake for the left front wheel is performed. Furthermore, since each of the brake units 95 is the same as the known brake unit, the detailed description thereof will be omitted.

That is, in the braking force distribution device B, braking forces different from each other are applied to the left and right wheels, and thus moment is generated in the vehicle. As a result, the understeer is suppressed. Hereinafter, a control, which suppresses the understeer by applying the braking forces different from each other to the left and right wheels, is referred to as a 'skid prevention brake control'.

Figure 5:
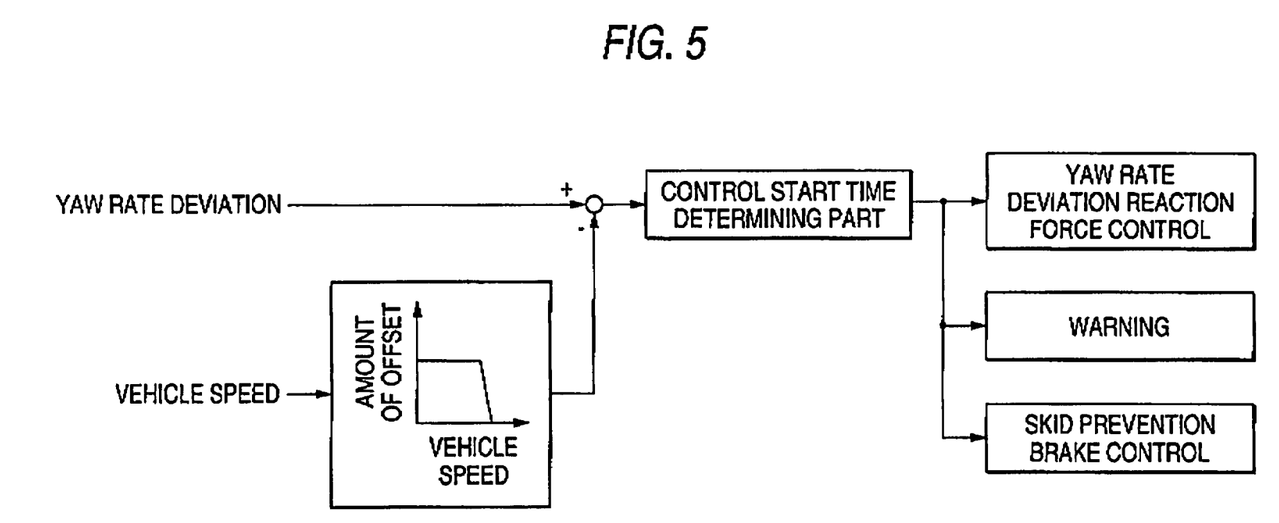
FIG. 5 is a block diagram showing an understeer suppressing control in the embodiment.
Figure 6:
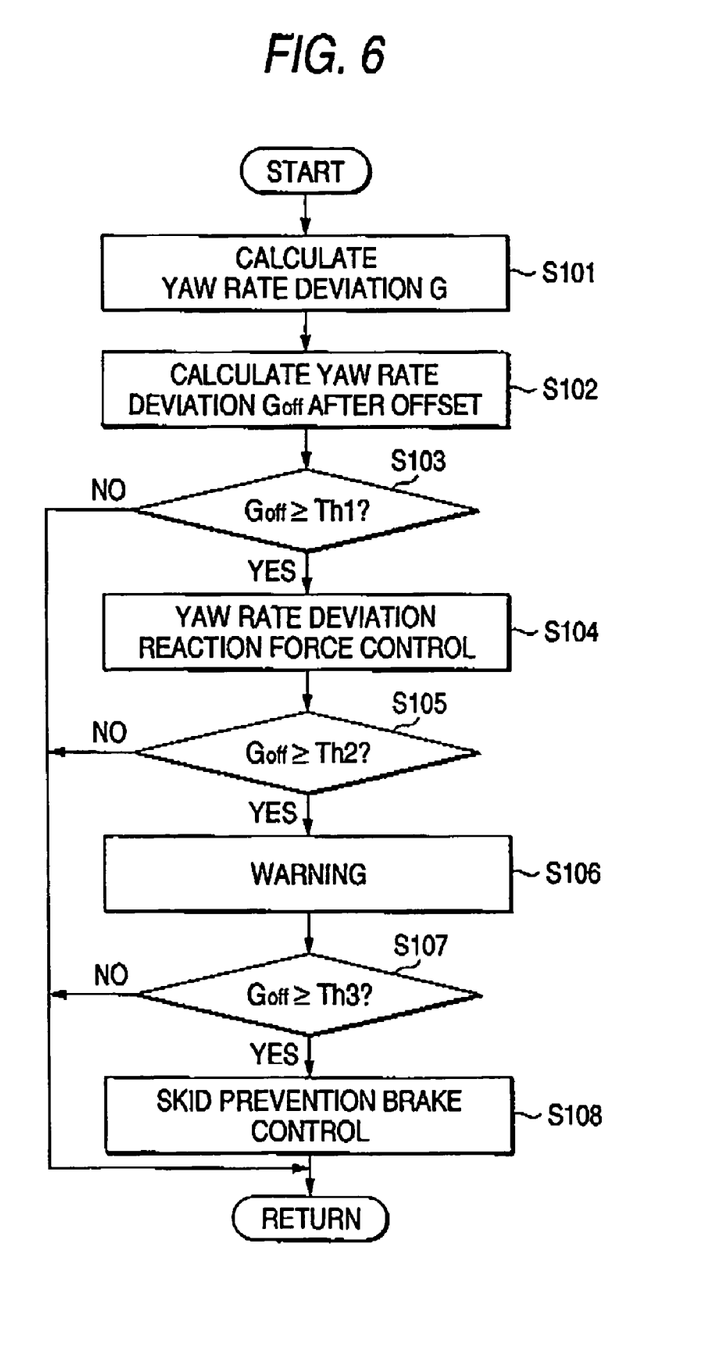
FIG. 6 is a flow chart showing an understeer suppressing control in the embodiment.
Figure 7:
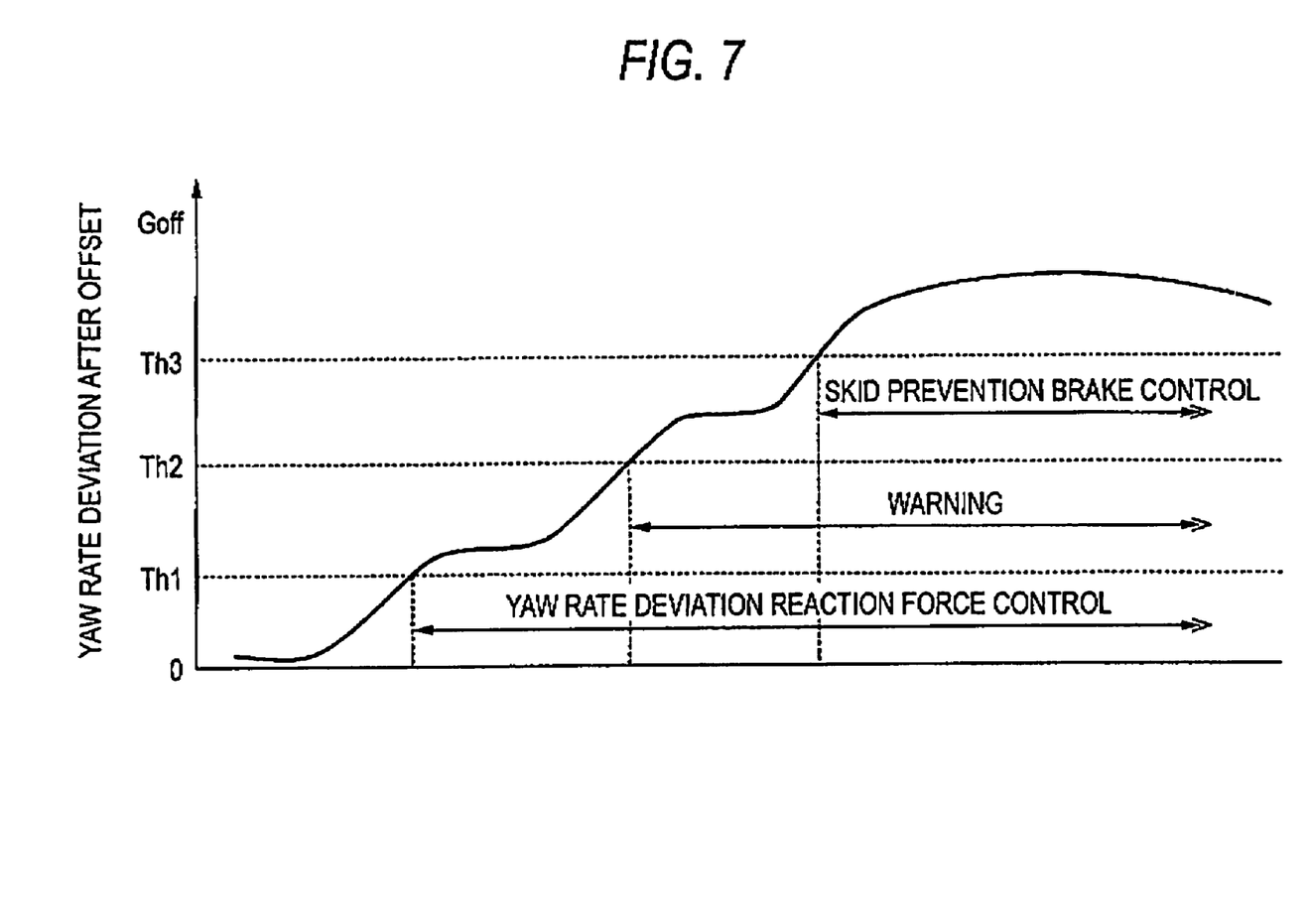
FIG. 7 is a time chart showing an understeer suppressing control in the embodiment.

Next, the operation of the understeer suppressing apparatus, which is the characteristic of the invention, will be described with reference to a block diagram shown in FIG. 5, a flow chart shown in FIG. 6, and a time chart shown in FIG. 7. An understeer suppressing control routine shown in the flow chart of FIG. 6 is repeatedly performed at every predetermined time, and is mainly performed by the steering control unit 20.

The understeer suppressing apparatus expects the degree of understeer by using the yaw rate deviation $G_{off}$ after offset as a parameter, and takes understeer countermeasures according to the degree of understeer step by step.

First, the yaw rate deviation G is calculated in a step S101, and then the yaw rate deviation $G_{off}$ after offset is calculated in a step S102. Since a method of calculating the yaw rate deviation G and the yaw rate deviation $G_{off}$ after offset has been described above in the description of the output torque control, the description thereof will be omitted here.

Next, the routine proceeds to a step S103, and it is determined whether the yaw rate deviation $G_{off}$ after offset is larger than a predetermined first set value Th1.

When the determination result from the step S103 is 'NO' ($G_{off}$<Th1), the degree of understeer is sufficiently small, that is, it is not necessary to take special understeer countermeasures. Accordingly, the routine is terminated.

When the determination result from the step S103 is 'YES' ($G_{off}$≧Th1), the routine proceeds to a step S104 and the yaw rate deviation reaction force control is performed by the electric power steering device S so that an excess steering assist force is suppressed and the degree of understeer is not increased any more.

The routine proceeds to a step S105 after the process in the step S104, and it is determined whether the yaw rate deviation $G_{off}$ after offset is larger than a predetermined second set value Th2. Meanwhile, the second set value Th2 is set larger than the first set value Th1 (Th2>Th1).

When the determination result from the step S105 is 'NO' (Th1≦$G_{off}$<Th2), the routine is terminated.

When the determination result from the step S105 is 'YES' ($G_{off}$≧Th2), the routine proceeds to a step S106. In this case, a warning sound is generated and a warning lamp is flashed by the operation of the warning device A, and thus the driver perceives that the vehicle is in the unstable state. For this reason, it is possible to allow the driver to drive the vehicle in a stable direction. It is preferable that the generation of the warning sound or the flash of the warning lamp be intermittently performed in a predetermined periodic time. In addition, it is also preferable that the driver be informed of the emergency by shortening the periodic time in accordance with the increase of the yaw rate deviation $G_{off}$ after offset (that is, the increase of the degree of understeer). Furthermore, since the operation of the warning device A is an additional operation, the yaw rate deviation reaction force control is also continuously performed during the operation of the warning device A.

The routine proceeds to a step S107 after the process in the step S106, and it is determined whether the yaw rate deviation $G_{off}$ after offset is larger than a predetermined third set value Th3. Meanwhile, the third set value Th3 is set larger than the second set value Th2 (Th3>Th2).

When the determination result from the step S107 is 'NO' (Th2≦$G_{off}$<Th3), the routine is terminated.

When the determination result from the step S107 is 'YES' ($G_{off}$≧Th3), the routine proceeds to a step S108. In this case, the skid prevention brake control is performed by the braking force distribution device B so that the degree of understeer is not increased any more. Furthermore, since the operation of the braking force distribution device B is an additional operation, the yaw rate deviation reaction force control and operation of the warning device A are also continuously performed during the skid prevention brake control performed by the braking force distribution device B.

As described above, according to the understeer suppressing apparatus for a vehicle, when the degree of understeer is relatively small, steering is suppressed by the reaction force control of the electric power steering device S. Accordingly, it is possible to improve from the understeer state. Furthermore, when the degree of understeer is increased in spite of the steering suppression performed by the electric power steering device S, the driver perceives that the vehicle is in the understeer state by the warning device A. For this reason, it is possible to allow the driver to drive the vehicle in a direction improving from the understeer state. When the degree of understeer is increased in spite of the information from the warning device A, the understeer can be compulsorily suppressed by the braking force distribution device B.

That is, since informing the driver and operation to the vehicle are performed in accordance with the degree of understeer step by step in the understeer suppressing apparatus for a vehicle, it is possible to inform the driver of the vehicle state in an early step, and to allow the driver to drive the vehicle in a stable direction. Moreover, the driver can easily and reliably perceive that the vehicle is in the understeer state. In addition, since the warning device informs the driver of the understeer state in two stages, it is possible to prevent the confused sound from being generated. Furthermore, since the braking force distribution device B is operated in the final stage, it is possible to reliably stabilize the vehicle.

Another Embodiment

Meanwhile, the invention is not limited to the above-mentioned embodiment.

For example, in the above-mentioned embodiment, the degree of understeer is expected by using a deviation (yaw rate deviation) between the standard yaw rate and the yaw rate as a parameter. However, the degree of understeer may be expected on the basis of another physical property, which is changed in accordance with the degree of understeer.

In addition, in the above-mentioned embodiment, although the steering reaction force device is composed of the electric power steering device, the steering reaction force device can be also composed of a reaction force device of the steering device of a steer by wire system (SBW). The SBW is a steering system that includes an operator and a steering mechanism to be mechanically separated from each other, reaction motor for applying a reaction force to the operator, and a steering motor to be provided in the steering mechanism to generate a force for steering drive steering wheels.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A method of suppressing understeer of a vehicle, comprising the steps of:
   suppressing front wheel steering with a steering reaction force device when the vehicle is in an understeer state;
   informing with an alarm device that the vehicle is in the understeer state; and
   applying braking forces with a braking force distribution device to at least one of a left and right wheel of the vehicle,
   wherein as the amount of understeer is increased, the steering reaction force device, the alarm device, and the braking force distribution device are operated in this order.

2. The method of suppressing understeer of claim 1, wherein during the step of informing, the steering reaction force device is continuously operated.

3. The method of suppressing understeer of claim 1, wherein during the step of applying brake forces, the steering reaction force device and the alarm device are continuously operated.

* * * * *